US009692960B2

(12) United States Patent
Wang

(10) Patent No.: US 9,692,960 B2
(45) Date of Patent: Jun. 27, 2017

(54) METHOD AND SYSTEM FOR ENABLING CAMERA OF MOBILE TERMINAL TO AUTOMATICALLY ADAPT CAMERA PARAMETERS ACCORDING TO SCENE MOTION

(71) Applicant: HUIZHOU TCL MOBILE COMMUNICATION CO., LTD, Huizhou (CN)

(72) Inventor: Yunhui Wang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/770,362

(22) PCT Filed: Jun. 4, 2014

(86) PCT No.: PCT/CN2014/079130
§ 371 (c)(1),
(2) Date: Aug. 25, 2015

(87) PCT Pub. No.: WO2015/143779
PCT Pub. Date: Oct. 1, 2015

(65) Prior Publication Data
US 2016/0156846 A1    Jun. 2, 2016

(30) Foreign Application Priority Data

Mar. 26, 2014 (CN) .......................... 2014 1 0115692

(51) Int. Cl.
*H04N 5/232* (2006.01)
(52) U.S. Cl.
CPC ..... *H04N 5/23216* (2013.01); *H04N 5/23245* (2013.01); *H04N 5/23258* (2013.01); *H04N 5/232* (2013.01)

(58) Field of Classification Search
None
See application file for complete search history.

(56) References Cited

U.S. PATENT DOCUMENTS

2003/0234885 A1* 12/2003 Pilu .................... H04N 5/23248
348/333.01
2006/0170816 A1  8/2006 Silverstein et al.
(Continued)

FOREIGN PATENT DOCUMENTS

CN         1968400 A    5/2007
CN       101374214 A    2/2009
(Continued)

OTHER PUBLICATIONS

Search Report and Office Action from CN application No. 201410115692.4 dated Dec. 5, 2016.
(Continued)

*Primary Examiner* — Justin P Misleh
(74) *Attorney, Agent, or Firm* — Shimokaji IP

(57) ABSTRACT

A method and a system for a mobile terminal camera, to automatically adapt to scenarios, may include collecting motion data of a mobile terminal, within a predetermined period of time, via a sensor, acquiring a number of times when a maximum value of the motion data exceeds a predetermined value, obtaining a current motion scenario through analysis of the motion data according to the number of times the motion data exceeds the predetermined value, and automatically adjusting camera operation parameters according to the current motion scenario. Thereby, the present invention may make it unnecessary for a user to conduct frequent operations, so the user can conveniently and rapidly take pictures or videos in agreement with a current environment.

9 Claims, 3 Drawing Sheets

(56) References Cited

U.S. PATENT DOCUMENTS

| | | | | |
|---|---|---|---|---|
| 2009/0319221 A1* | 12/2009 | Kahn | ............... | A61B 5/1123 |
| | | | | 702/141 |
| 2010/0033422 A1* | 2/2010 | Mucignat | ............ | G06F 1/1626 |
| | | | | 345/156 |
| 2011/0286731 A1* | 11/2011 | Gallagher | ............ | G03B 17/00 |
| | | | | 396/53 |
| 2013/0242120 A1* | 9/2013 | Venkatraman | ......... | H04N 5/225 |
| | | | | 348/208.4 |
| 2014/0188638 A1* | 7/2014 | Jones | ............... | H04M 1/72569 |
| | | | | 705/16 |
| 2015/0164430 A1* | 6/2015 | Hu | ..................... | A61B 5/7264 |
| | | | | 600/595 |
| 2016/0206921 A1* | 7/2016 | Szabados | ............ | A61B 5/0024 |

FOREIGN PATENT DOCUMENTS

| | | |
|---|---|---|
| CN | 101867717 A | 10/2010 |
| CN | 102016908 A | 4/2011 |
| CN | 103079013 A | 5/2013 |
| CN | 103500047 A | 1/2014 |
| CN | 103596020 A | 2/2014 |

OTHER PUBLICATIONS

Search Report and Office Action from PCT international application No. PCT/CN2014/079129 dated Dec. 16, 2014.

* cited by examiner

METHOD AND SYSTEM FOR ENABLING CAMERA OF MOBILE TERMINAL TO AUTOMATICALLY ADAPT CAMERA PARAMETERS ACCORDING TO SCENE MOTION

TECHNICAL FIELD

The present disclosure relates to the field of mobile terminal software. In particular, the present disclosure relates to a method and a system for a mobile terminal camera to automatically adapt to scenarios.

BACKGROUND

Currently, smart phones are developing rapidly. Mobile terminals are becoming popular and common, such as a cell phone, to take pictures. Furthermore, cell phones have increasingly powerful camera functions, some cell phones even have camera capabilities as good as those of professional card cameras. There may be a variety of scenarios where a camera may be used, for example, indoor, outdoor, moving, still, etc. Different camera parameters are required for different scenarios. However, existing mobile terminal cameras are unable to achieve the function of self-adaptation to scenarios. As a result, a user needs to make manual adjustments to the camera, leading to very inconvenient operations.

Therefore, the prior art is in need of improvement and development.

SUMMARY

In light of the above drawbacks of the prior art, the objects of the present invention are to provide a method and a system for a mobile terminal camera to automatically adapt to scenarios with the intention to solve the problems associated with existing mobile terminal cameras being unable to automatically adapt to scenarios.

A method for a mobile terminal camera to automatically adapt to scenarios includes collecting motion data of the mobile terminal, within a predetermined period of time, via a sensor; acquiring a number of times when a maximum value of the motion data exceeds a predetermined value; and obtaining a current motion scenario through analysis of the motion data according to the number of times that the maximum value of the motion data exceeds the predetermined value, and automatically adjusting camera operation parameters according to the current motion scenario.

In another embodiment, a method for a mobile terminal camera to automatically adapt to scenarios includes presetting corresponding relations between a plurality of motion scenarios and respective camera operation parameters, said plurality of motion scenarios including: a walking mode, a bike mode, an automobile mode, a leaning mode, and a still mode.

In a further embodiment, a method for a mobile terminal camera to automatically adapt to scenarios includes a predetermined value that comprises: a first threshold value, a second threshold value, a third threshold value, and a fourth threshold value, and wherein the fourth threshold value is greater than the third threshold value is greater than the second threshold value is greater than the first threshold value, and further comprising: acquiring a respective number of times when the maximum value of the motion data is between the first threshold value and the second threshold value, between the second threshold value and the third threshold value, between the third threshold value and the fourth threshold value, and greater than the fourth threshold value.

In yet another embodiment, a method for a mobile terminal camera to automatically adapt to scenarios includes determining if the number of times when the maximum value is greater than the fourth threshold value is greater than a walking mode value, if the number of times when the maximum value is greater than the fourth threshold value is determined to be greater than the walking mode value, determining that the mobile terminal is currently in the walking mode, and if the number of times when the maximum value is greater than the fourth threshold value is determined to not be greater than the walking mode value determining if the number of times when the maximum value is between the third threshold value and the fourth threshold value is greater than a bike mode value, if the number of times when the maximum value is between the third threshold value and the fourth threshold value is determined to be greater than the bike mode value, determining that the mobile terminal is currently in the bike mode, and if the number of times when the maximum value is between the third threshold value and the fourth threshold value is determined to not be greater than the bike mode value, determining if the number of times when the maximum value is between the second threshold value and the third threshold value is greater than an automobile mode value, if the number of times when the maximum value is between the second threshold value and the third threshold value is determined to be greater than the automobile mode value, determining that the mobile terminal is currently in the automobile mode, and if the number of times when the maximum value is between the second threshold value and the third threshold value is determined to not be greater than the automobile mode value, determining if the number of times when the maximum value is between the first threshold value and the second threshold value is greater than a leaning mode value, if the number of times when the maximum value is between the first threshold value and the second threshold value is determined to be greater than the leaning mode value, determining that the mobile terminal is currently in the leaning mode, and if the number of times when the maximum value is between the first threshold value and the second threshold value is determined to not be greater than the leaning mode value, determining that the mobile terminal is currently in the still mode; wherein the walking mode value, the bike mode value, the automobile mode value and the leaning mode value are used to determine threshold values of the walking mode, the bike mode, the automobile mode and the leaning mode, respectively.

In yet a further embodiment, a method for a mobile terminal camera to automatically adapt to scenarios includes adjusting current camera operation parameters to operation parameters corresponding to the current mode of the mobile terminal according to the current motion scenario of the mobile terminal obtained through analysis of the motion data, and preset corresponding relations between a plurality of motion scenarios and respective camera operation parameters.

In another embodiment, a method for a mobile terminal camera to automatically adapt to scenarios includes an acceleration sensor, and motion data is an acceleration value.

In a further embodiment, a system for a mobile terminal camera to automatically adapt to scenarios includes a data collection module for collecting motion data of a mobile terminal, within a predetermined period of time, via a sensor; a data analysis module for acquiring a number of times when a maximum value of the motion data exceeds a predetermined value; and an automatic adjustment module for obtaining a current motion scenario through analysis of the motion data according to the number of times the maximum value of the motion data exceeds the predetermined value, and automatically adjusting camera operation parameters according to the current motion scenario.

In yet another embodiment, a system for a mobile terminal camera to automatically adapt to scenarios includes a presetting module for presetting corresponding relations between a plurality of motion scenarios and respective camera operation parameters, said motion scenarios including: a walking mode, a bike mode, an automobile mode, a leaning mode, and a still mode.

In yet a further embodiment, a system for a mobile terminal camera to automatically adapt to scenarios includes a predetermined value that comprises a first threshold value, a second threshold value, a third threshold value, and a fourth threshold value, the fourth threshold value is greater than the third threshold value is greater than the second threshold value is greater than the first threshold value, and a data analysis module that comprises: a count acquiring unit for acquiring a respective number of times when a maximum value of motion data is between the first threshold value and the second threshold value, between the second threshold value and the third threshold value, between the third threshold value and the fourth threshold value, and greater than the fourth threshold value.

In another embodiment, a system for a mobile terminal camera to automatically adapt to scenarios includes an automatic adjustment module that comprises: a first determining unit for determining if the number of times when the maximum value is greater than the fourth threshold value is greater than a walking mode value, if the number of times when the maximum value is greater than the fourth threshold value is determined to be greater than the walking mode value, determining that the mobile terminal is currently in the walking mode, and if the number of times when the maximum value is greater than the fourth threshold value is determined to not be greater than the walking mode value; a second determining unit determines if the number of times when the maximum value is between the third threshold value and the fourth threshold value is greater than a bike mode value, if the number of times when the maximum value is between the third threshold value and the fourth threshold value is determined to be greater than the bike mode value, determining that the mobile terminal is currently in the bike mode, and if the number of times when the maximum value is between the third threshold value and the fourth threshold value is determined to not be greater than the bike mode value; a third determining unit determines if the number of times when the maximum value is between the second threshold value and the third threshold value is greater than an automobile mode value, if the number of times when the maximum value is between the second threshold value and the third threshold value is determined to be greater than the automobile mode value, determining that the mobile terminal is currently in the automobile mode, and if the number of times when the maximum value is between the second threshold value and the third threshold value is determined to not be greater than the automobile mode value; a fourth determining unit determines if the number of times when the maximum value is between the first threshold value and the second threshold value is greater than a leaning mode value, if the number of times when the maximum value is between the first threshold value and the second threshold value is determined to be greater than the leaning mode value, determining that the mobile terminal is currently in the leaning mode, and if the number of times when the maximum value is between the first threshold value and the second threshold value is determined to not be greater than the leaning mode value, determining that the mobile terminal is currently in the still mode; wherein the walking mode value, bike mode value, the automobile mode value and the leaning mode value are used to determine threshold values of the walking mode, the bike mode, the automobile mode and the leaning mode, respectively.

In a further embodiment, the present invention collects motion data of a mobile terminal within a predetermined period of time via a sensor, acquires the number of times when a maximum value of the motion data exceeds a predetermined value, obtains a current motion scenario of a user through analysis of the motion data according to the number of times that the maximum value of the motion data exceeds the predetermined value, and achieves adjustments of camera operation parameters, making it unnecessary for the user to conduct frequent operations while the user can conveniently and rapidly take pictures or videos in agreement with a current environment.

DETAILED DESCRIPTION

A method and a system for a mobile terminal camera to automatically adapt to scenarios are provided. To make the objects, technical solutions and effects of the present invention clear, exemplary embodiments of the present invention are described in detail. It should be understood that the exemplary embodiments are for illustrative purposes. The exemplary embodiments are not intended to limit the scope of the claimed invention in any way.

Figure 1:
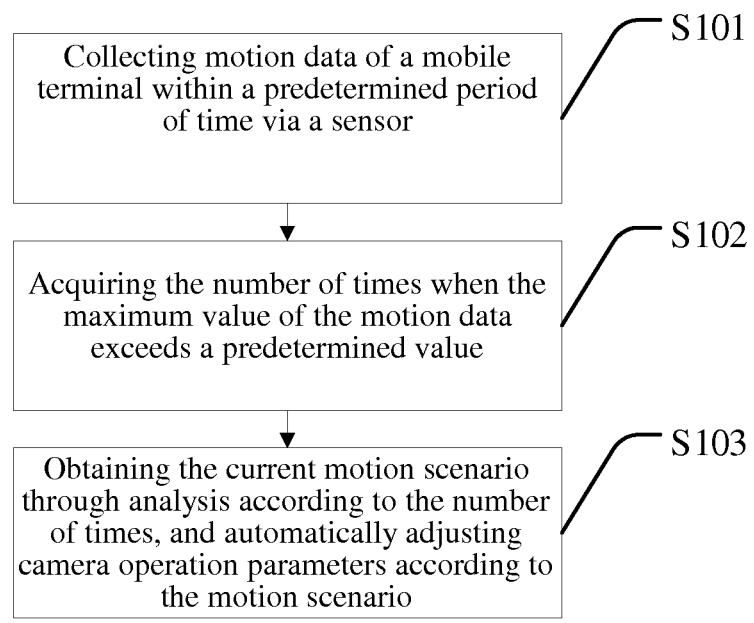
FIG. 1 depicts a flow chart of an exemplary embodiment of a method for a mobile terminal camera to automatically adapt to scenarios according to the present invention.

With reference to FIG. 1, a flow chart of a method for a mobile terminal camera to automatically adapt to scenarios includes collecting motion data of a mobile terminal, within a predetermined period of time, via a sensor (block S101). The method may also include acquiring a number of times when a maximum value of the motion data exceeds a predetermined value (block S102). The method may further include obtaining a current motion scenario through analysis of the motion data according to the number of times that the maximum value of the motion data exceeds the predetermined value, and automatically adjusting camera operation parameters according to the current motion scenario (block S103).

For example, a sensor may collect motion data of a mobile terminal. The motion data may depend on a type of the sensor. For example, if the sensor is an acceleration sensor, the motion data may be representative of an acceleration value. An acceleration value of the mobile terminal can be detected based on, for example, the acceleration sensor. While the acceleration value can reflect a current motion state of the mobile terminal, when a person is in a walking state, a data wave diagram may be collected through the mobile terminal. The data wave diagram may be collected, for example, through a typical acceleration sensor with an X-axis representing time and a Y-axis representing acceleration values. A data wave diagram, of the acceleration values, may show a trend of steady change in the acceleration values. Thereby, the current motion state of a mobile terminal can be reached backwardly according to a rule of acceleration value change.

Furthermore, the current motion scenario of the mobile terminal can be obtained through analysis of the motion data according to a number of times when a maximum acceleration value exceeds a predetermined value, as for example, when a swinging magnitude of the mobile terminal is different in different motion scenarios. Accordingly, a current motion scenario of the mobile terminal can be obtained through analysis of the motion data, and operation parameters can be automatically adjusted according to the current motion scenario.

The method may further include presetting corresponding relations between a plurality of motion scenarios and respective camera operation parameters. For example, the motion scenarios may include a walking mode, a bike mode, an automobile mode, a leaning mode, and a still mode. Corresponding relations, between the plurality of motion scenarios and the respective camera operation parameters, may be preset such that, for example, one motion scenario corresponds to a set of camera operation parameters. Thereby, when the mobile terminal is in a current motion scenario, corresponding camera operation parameters can be automatically called such that the mobile terminal camera may operate under an optimal environment and parameters, and the camera may take better pictures or videos. The motion scenarios (e.g., a walking mode, a bike mode, an automobile mode, a leaning mode, and a still mode) may correspond to a walking scenario, a bike scenario, and so on, respectively, and the leaning mode may correspond to an unsteady state between stillness and lifting. According to a user's needs, a variety of modes may be further defined so as to meet more specific and actual needs of a user. For example, the walking mode can be further classified into fast walking and slow walking modes, etc.

The method may include adjusting current camera operation parameters to operation parameters corresponding to a current mode of the mobile terminal according to a current mode of the mobile terminal obtained through analysis of motion data and comparison with preset corresponding relations between a plurality of motion scenarios and respective camera operation parameters (block S103). Maximum values of acceleration, as collected by an acceleration sensor, may be different in different motion states. For example, during walking, the maximum value of acceleration may be relatively high compared to riding in an automobile, where the maximum value of acceleration may be relatively low. As a result, a motion scenario of a mobile terminal can be accurately obtained through analysis of the motion data according to a number of times when a maximum value exceeds different threshold values. As an example, predetermined values may include: a first threshold value, a second threshold value, a third threshold value, and a fourth threshold value, the fourth threshold value may be greater than the third threshold value may be greater than the second threshold value may be greater than the first threshold value. Accordingly, the method may include acquiring a respective number of times when a maximum value of the motion data is between the first threshold value and the second threshold value, between the second threshold value and the third threshold value, between the third threshold value and the fourth threshold value, and greater than the fourth threshold value (block S102).

Figure 2:
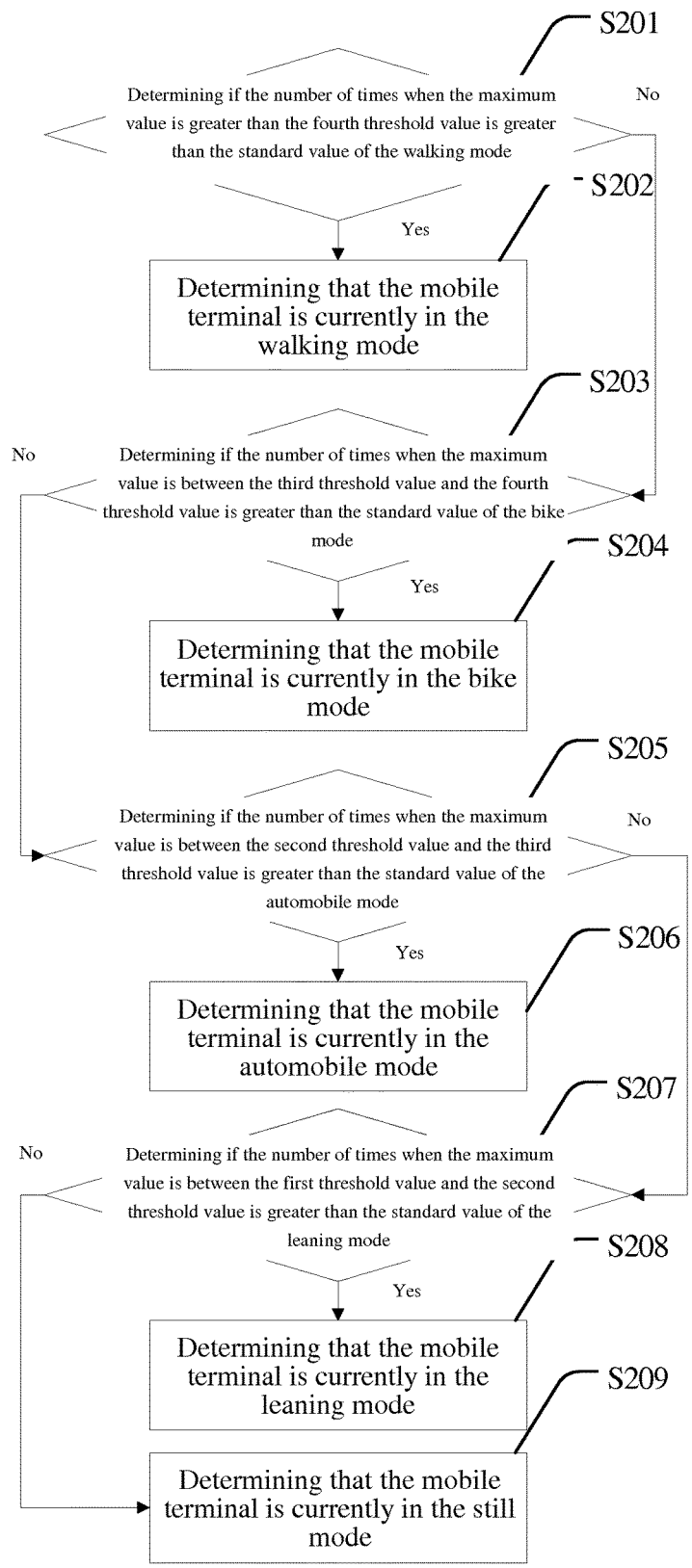
FIG. 2 depicts a flow chart of a portion of the method illustrated in FIG. 1 according to the present invention.

Turning to FIG. 2, a method for a mobile terminal camera to automatically adapt to scenarios may include determining if a number of times when a maximum value is greater than a fourth threshold value is greater than a walking mode value, if the number of times when the maximum value is greater than the fourth threshold value is determined to be greater than the walking mode value, determining that the mobile terminal is currently in the walking mode, determining that the mobile terminal is currently in the walking mode (block S202); and if the number of times when the maximum value is greater than the fourth threshold value is determined to not be greater than the walking mode value, determining if the number of times when the maximum value is between the third threshold value and the fourth threshold value is greater than a bike mode value, if the number of times when the maximum value is between the third threshold value and the fourth threshold value is determined to be greater than the bike mode value (block S203), determining that the mobile terminal is currently in the bike mode (block S204); and if the number of times when the maximum value is between the third threshold value and the fourth threshold value is determined to not be greater than the bike mode value (block S203), determining if the number of times when the maximum value is between the second threshold value and the third threshold value is greater than an automobile mode value, if the number of times when the maximum value is between the second threshold value and the third threshold value is determined to be greater than the automobile mode value (block S205), determining that the mobile terminal is currently in the automobile mode (block S206); and if the number of times when the maximum value is between the second threshold value and the third threshold value is determined to not be greater than the automobile mode value (block S205), determining if the number of times when the maximum value is between the first threshold value and the second threshold value is greater than a leaning mode value, if the number of times when the maximum value is between the first threshold value and the second threshold value is determined to be greater than the leaning mode value (block S207), determining that the mobile terminal is currently in the leaning mode (block S208); and if the number of times when the maximum value is between the first threshold value and the second threshold value is determined to not be greater than the leaning mode value (block S207), determining that the mobile terminal is currently in the still mode (block S209). The walking mode value, the bike mode value, the automobile mode value and the leaning mode value may be, for example, used to determine threshold values of the walking mode, the bike mode, the automobile mode and the leaning mode, respectively.

The first threshold value, the second threshold value, the third threshold value, and the fourth threshold value may be used to determine threshold values of the operation modes, respectively. For example, in the walking mode, when the maximum value is greater than the fourth threshold value, an associated mobile terminal may be determined to be operating in the walking mode, while the corresponding walking mode value may refer to the threshold value for determining the number of times a maximum motion value for the walking mode exceeds a given value. For example, when the number of times when the maximum value of the motion data is greater than the fourth threshold value is greater than the walking mode value, the mobile terminal may be determined to be currently operating in the walking mode, and so on.

For example, determining that the number of times when the maximum value is greater than the fourth threshold value is greater than the walking mode value may indicate that the determination criterion of the walking mode is met, and at this moment, the number of times of a high acceleration value may be relatively high, and it can be determined that the mobile terminal is in the walking mode. If the number of times when the maximum value is greater than the fourth threshold value is greater than the walking mode value, the number of times when the maximum value is between the third threshold value and the fourth threshold value is greater than the bike mode value may be determined. When the maximum value, between the third threshold value and the fourth threshold value, is greater than the bike mode value, the mobile terminal may be determined to be operating in the bike mode. If the number of times when the maximum value is between the second threshold value and the third threshold value is determined to be greater than the automobile mode value, the mobile terminal may be determined to be operating in the automobile mode. If the number of times when the maximum value is between the first threshold value and the second threshold value is determined to be greater than the leaning mode value, the mobile terminal may be determined to be currently operating in the leaning mode. If the number of times when the maximum value is between the second threshold value and the third threshold value is determined to not be greater than the automobile mode value, and the acceleration value is at a relatively low level, the mobile terminal may be determined to be currently operating in the still mode.

When the current mode of the mobile terminal is detected with the above method, the camera operation parameters can be adjusted to an optimal level if a user turns on the mobile terminal camera. For example, on an existing smart phone such as an Android cell phone, the camera's user scenarios may include a portrait mode, a scenery mode, a sports mode, a night mode, a sunset mode, an anti-shake mode, etc. When it is detected that a user is currently in an automobile mode, the camera can be adjusted to a sports mode, and the camera may automatically adjust operation parameters to the operation parameters of the sports mode. When it is detected that a user is currently in a still mode, the camera can exit the sports mode, and the camera operation parameters can be adjusted. Based on the above principle, the claimed invention can preset operation parameters corresponding to a plurality of motion scenarios in the mobile terminal system, such that the camera has optimal performance.

Figure 3:
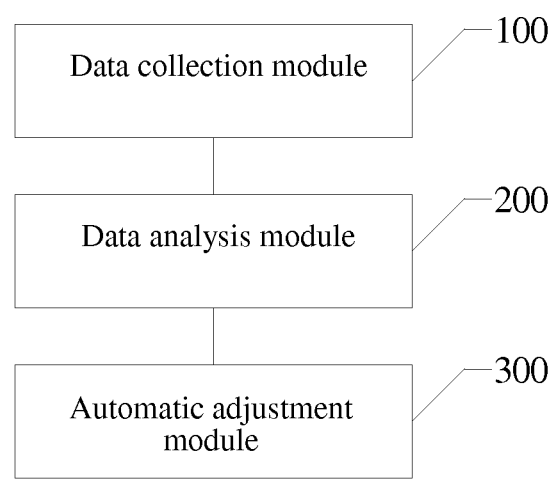
FIG. 3 depicts a structural block diagram of an exemplary embodiment of a system for a mobile terminal camera to automatically adapt to scenarios according to the present invention.

With reference to FIG. 3, a system for a mobile terminal camera to automatically adapt to scenarios may include a data collection module 100 for collecting motion data of a mobile terminal, within a predetermined period of time, via a sensor. The system may also include a data analysis module 200 for acquiring a number of times when a maximum value of the motion data exceeds a predetermined value. The system may further include an automatic adjustment module 300 for obtaining a current motion scenario through analysis of the motion data according to the number of times that the maximum value of the motion data exceeded the predetermined value, and automatically adjusting camera operation parameters according to the current motion scenario.

The system may further include a presetting module for presetting corresponding relations between a plurality of motion scenarios and respective camera operation parameters. The motion scenarios may including a walking mode, a bike mode, an automobile mode, a leaning mode, and a still mode.

Furthermore, the predetermined value may include a first threshold value, a second threshold value, a third threshold value, and a fourth threshold value; the fourth threshold value is greater than the third threshold value is greater than the second threshold value is greater than the first threshold value. The data analysis module 200 may include a count acquiring unit for acquiring a respective number of times when a maximum value of the motion data is between the first threshold value and the second threshold value, between the second threshold value and the third threshold value, between the third threshold value and the fourth threshold value, and greater than the fourth threshold value.

Furthermore, the automatic adjustment module 300 may include a first determining unit for determining if the number of times when the maximum value is greater than the fourth threshold value is greater than a walking mode value, if the number of times when the maximum value is greater than the fourth threshold value is determined to be greater than the walking mode value, determining that the mobile terminal is currently in the walking mode, and if the number of times when the maximum value is greater than the fourth threshold value is determined to not be greater than the walking mode value.

The automatic adjustment module 300 may also include a second determining unit that determines if the number of times when the maximum value is between the third threshold value and the fourth threshold value is greater than a bike mode value, if the number of times when the maximum value is between the third threshold value and the fourth threshold value is determined to be greater than the bike mode value, determining that the mobile terminal is currently in the bike mode, and if the number of times when the maximum value is between the third threshold value and the fourth threshold value is determined to not be greater than the bike mode value.

The automatic adjustment module 300 may further include a third determining unit that determines if the number of times when the maximum value is between the second threshold value and the third threshold value is greater than an automobile mode value, if the number of times when the maximum value is between the second threshold value and the third threshold value is determined to be greater than the automobile mode value, determining that the mobile terminal is currently in the automobile mode, and if the number of times when the maximum value is between the second threshold value and the third threshold value is determined to not be greater than the automobile mode value.

The automatic adjustment module 300 may yet further include a fourth determining unit that determines if the number of times when the maximum value is between the first threshold value and the second threshold value is greater than a leaning mode value, if the number of times when the maximum value is between the first threshold value and the second threshold value is determined to be greater than the leaning mode value, determining that the mobile terminal is currently in the leaning mode, and if the number of times when the maximum value is between the first threshold value and the second threshold value is determined to not be greater than the leaning mode value, determining that the mobile terminal is currently in the still mode. The walking mode value, the bike mode value, the automobile mode value and the leaning mode value may be used to determine threshold values of the walking mode, the bike mode, the automobile mode and the leaning mode, respectively.

Motion data of a mobile terminal may be collected within a predetermined period of time via a sensor, a number of times when a maximum value of the motion data exceeds a predetermined value may be acquired, a current motion scenario of the user may be obtained through analysis of the motion data according to a number of times that the maximum value of the motion data exceeds the predetermined value, and adjustments of camera operation parameters may be achieved, making it unnecessary for a user to conduct frequent operations while the user can conveniently and rapidly take pictures or videos in agreement with the current environment.

It should be understood that applications of the present invention are not limited to the above exemplary embodiments. To those skilled in the art, improvements or modifications may be made according to the above description, and all of these improvements or modifications shall be encompassed by the scope of the appended claims.

The invention claimed is:

1. A method for a mobile terminal camera to automatically adapt to scenarios, the method comprising:
   presetting corresponding relations between a plurality of motion scenarios and respective camera operation parameters;
   collecting motion data of a mobile terminal, within a predetermined period of time, via a sensor;
   acquiring a number of times when a maximum value of the motion data exceeds a predetermined value, wherein the predetermined value comprises: a first threshold value, a second threshold value, a third threshold value, and a fourth threshold value, and wherein the fourth threshold value is greater than the third threshold value is greater than the second threshold value is greater than the first threshold value;
   wherein the acquiring acquires a respective number of times when the maximum value of the motion data is between the first threshold value and the second threshold value, between the second threshold value and the third threshold value, between the third threshold value and the fourth threshold value, and greater than the fourth threshold value; and
   obtaining a current motion scenario through analysis of the motion data according to the number of times that the maximum value of the motion data exceeds the predetermined value, and automatically adjusting camera operation parameters according to the current motion scenario.

2. The method for a mobile terminal camera to automatically adapt to scenarios according to claim 1,
   wherein said plurality of motion scenarios include: a walking mode, a bike mode, an automobile mode, a leaning mode, and a still mode.

3. The method for a mobile terminal camera to automatically adapt to scenarios according to claim 2, further comprising:
   determining if the number of times when the maximum value is greater than the fourth threshold value is greater than a walking mode value; if the number of times when the maximum value is greater than the fourth threshold value is determined to be greater than the walking mode value, determining that the mobile terminal is currently in the walking mode; and if the number of times when the maximum value is greater than the fourth threshold value is determined to not be greater than the walking mode value, determining if the number of times when the maximum value is between the third threshold value and the fourth threshold value is greater than a bike mode value; if the number of times when the maximum value is between the third threshold value and the fourth threshold value is determined to be greater than the bike mode value, determining that the mobile terminal is currently in the bike mode; and if the number of times when the maximum value is between the third threshold value and the fourth threshold value is determined to not be greater than the bike mode value, determining if the number of times when the maximum value is between the second threshold value and the third threshold value is greater than an automobile mode value; if the number of times when the maximum value is between the second threshold value and the third threshold value is determined to be greater than the automobile mode value, determining that the mobile terminal is currently in the automobile mode; and if the number of times when the maximum value is between the second threshold value and the third threshold value is determined to not be greater than the automobile mode value, determining if the number of times when the maximum value is between the first threshold value and the second threshold value is greater than a leaning mode value; if the number of times when the maximum value is between the first threshold value and the second threshold value is determined to be greater than the leaning mode value, determining that the mobile terminal is currently in the leaning mode; and if the number of times when the maximum value is between the first threshold value and the second threshold value is determined to not be greater than the leaning mode value, determining that the mobile terminal is currently in the still mode;
   wherein the walking mode value, the bike mode value, the automobile mode value and the leaning mode value are used to determine threshold values of the walking mode, the bike mode, the automobile mode and the leaning mode, respectively.

4. The method for a mobile terminal camera to automatically adapt to scenarios according to claim 1, wherein modes of user scenarios of the camera comprise: a portrait mode, a scene mode, a sports mode, a night mode, a sunset mode, and an anti-shake mode.

5. The method for a mobile terminal camera to automatically adapt to scenarios according to claim 1, wherein the sensor is an acceleration sensor, and the motion data is an acceleration value.

6. A method for a mobile terminal camera to automatically adapt to scenarios, the method comprising:
   presetting corresponding relations between a plurality of motion scenarios and respective camera operation parameters, said plurality of motion scenarios including: a walking mode, a bike mode, an automobile mode, a leaning mode, and a still mode;
   collecting motion data of a mobile terminal, within a predetermined period of time, via a sensor;
   acquiring a number of times when a maximum value of the motion data exceeds a predetermined value, wherein the predetermined value comprises: a first threshold value, a second threshold value, a third threshold value, and a fourth threshold value, and wherein the fourth threshold value is greater than the third threshold value is greater than the second threshold value is greater than the first threshold value;

wherein the acquiring acquires a respective number of times when the maximum value of the motion data is between the first threshold value and the second threshold value, between the second threshold value and the third threshold value, between the third threshold value and the fourth threshold value, and greater than the fourth threshold value; and obtaining a current motion scenario through analysis of the motion data according to the number of times that the maximum value of the motion data exceeds the predetermined value, and automatically adjusting camera operation parameters according to the current motion scenario, wherein the current camera operation parameters are adjusted to operation parameters corresponding to the current mode of the mobile terminal according to the current motion scenario of the mobile terminal obtained through analysis of the motion data, and preset corresponding relations between a plurality of motion scenarios and respective camera operation parameters.

7. The method for a mobile terminal camera to automatically adapt to scenarios according to claim 6, further comprising:

determining if the number of times when the maximum value is greater than the fourth threshold value is greater than a walking mode value; if the number of times when the maximum value is greater than the fourth threshold value is determined to be greater than the walking mode value, determining that the mobile terminal is currently in the walking mode; and if the number of times when the maximum value is greater than the fourth threshold value is determined to not be greater than the walking mode value determining if the number of times when the maximum value is between the third threshold value and the fourth threshold value is greater than a bike mode value; if the number of times when the maximum value is between the third threshold value and the fourth threshold value is determined to be greater than the bike mode value, determining that the mobile terminal is currently in the bike mode; and if the number of times when the maximum value is between the third threshold value and the fourth threshold value is determined to not be greater than the bike mode value, determining if the number of times when the maximum value is between the second threshold value and the third threshold value is greater than an automobile mode value, if the number of times when the maximum value is between the second threshold value and the third threshold value is determined to be greater than the automobile mode value, determining that the mobile terminal is currently in the automobile mode, and if the number of times when the maximum value is between the second threshold value and the third threshold value is determined to not be greater than the automobile mode value, determining if the number of times when the maximum value is between the first threshold value and the second threshold value is greater than a leaning mode value, if the number of times when the maximum value is between the first threshold value and the second threshold value is determined to be greater than the leaning mode value, determining that the mobile terminal is currently in the leaning mode, and if the number of times when the maximum value is between the first threshold value and the second threshold value is determined to not be greater than the leaning mode value, determining that the mobile terminal is currently in the still mode;

wherein the walking mode value, the bike mode value, the automobile mode value and the leaning mode value are used to determine threshold values of the walking mode, the bike mode, the automobile mode and the leaning mode, respectively.

8. The method for a mobile terminal camera to automatically adapt to scenarios according to claim 6, wherein modes of user scenarios of the camera comprise: a portrait mode, a scene mode, a sports mode, a night mode, a sunset mode, and an anti-shake mode.

9. The method for a mobile terminal camera to automatically adapt to scenarios according to claim 6, wherein the sensor is an acceleration sensor, and the motion data is an acceleration value.

* * * * *